US012552057B2

(12) United States Patent
Godlieb et al.

(10) Patent No.: US 12,552,057 B2
(45) Date of Patent: Feb. 17, 2026

(54) METHODS OF MANUFACTURING A HAIR TRIMMER ATTACHMENT

(71) Applicant: KONINKLIJKE PHILIPS N.V., Eindhoven (NL)

(72) Inventors: Robert Godlieb, Drachten (NL); Martinus Bernardus Stapelbroek, Frieschepalen (NL); Rogier Enrico De Haas, Hilversum (NL); Peter Daniel Martijn Van Zoest, Zuidhorn (NL); Nicky Lewis, Zwolle (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 174 days.

(21) Appl. No.: 17/927,423

(22) PCT Filed: Jun. 21, 2021

(86) PCT No.: PCT/EP2021/066769
§ 371 (c)(1),
(2) Date: Nov. 23, 2022

(87) PCT Pub. No.: WO2021/259833
PCT Pub. Date: Dec. 30, 2021

(65) Prior Publication Data
US 2023/0191636 A1 Jun. 22, 2023

(30) Foreign Application Priority Data
Jun. 23, 2020 (EP) .................................... 20181746

(51) Int. Cl.
*B26B 19/38* (2006.01)
*B26B 19/04* (2006.01)

(52) U.S. Cl.
CPC ............ *B26B 19/384* (2013.01); *B26B 19/04* (2013.01); *B26B 19/3846* (2013.01)

(58) Field of Classification Search
CPC ....... B26B 21/443; B26B 19/40; B26B 19/04; B26B 19/3846; B26B 19/384
(Continued)

(56) References Cited

U.S. PATENT DOCUMENTS 2,249,825 A 7/1941 Hanley
2,290,326 A 7/1942 Hanley
(Continued)

FOREIGN PATENT DOCUMENTS

CN 106346519 A 1/2017
EP 3461602 A1 4/2019
(Continued)

OTHER PUBLICATIONS

International Search report and Written Opinion of PCT/EP2021/066769, dated Sep. 20, 2021.

*Primary Examiner* — Laura M Lee

(57) ABSTRACT

According to an aspect, there is provided a method of manufacturing a hair trimmer attachment for a hair trimmer, the hair trimmer attachment comprising a fixed blade comprising: a skin contacting part forming a surface of the hair trimmer attachment to be placed against the skin of a user, in use of the hair trimmer, and an angled part, the angled part being angled relative to the skin contacting part, wherein a plurality of hair openings are spaced apart along a bend between the skin contacting part and the angled part, portions of the fixed blade between the hair openings forming guard teeth of the fixed blade, the method comprising: providing a sheet of material for forming the fixed blade; deforming the sheet of material over a fixed blade support of the hair trimmer attachment to create the bend between the skin contacting part and the angled part of the fixed blade, the bend being curved or angled about an axis extending in
(Continued)

a first direction; and forming a compound curved and/or angled portion on the guard teeth.

12 Claims, 4 Drawing Sheets

(58) Field of Classification Search
USPC ......... 30/43.92, 346.51, 34.1, 34.2, 537–540
See application file for complete search history.

(56) References Cited

U.S. PATENT DOCUMENTS

| | | | | |
|---|---|---|---|---|
| 9,782,903 | B2 * | 10/2017 | Stapelbroek | B26B 19/3846 |
| 9,873,203 | B2 * | 1/2018 | Stapelbroek | B26B 19/384 |
| 11,351,684 | B2 * | 6/2022 | Phoon | B26B 19/063 |
| 11,642,802 | B2 * | 5/2023 | Xu | B26B 19/042<br>30/43.9 |
| 11,865,733 | B2 * | 1/2024 | Röder | B26B 19/3846 |
| 2011/0094110 | A1 | 4/2011 | Obermann | |
| 2017/0113361 | A1 | 4/2017 | Feijen et al. | |
| 2018/0104834 | A1 * | 4/2018 | Zuidervaart | B26B 19/3893 |
| 2018/0257248 | A1 * | 9/2018 | Wu | B26B 19/08 |
| 2020/0164533 | A1 | 5/2020 | Phoon | |
| 2021/0347071 | A1 * | 11/2021 | Xu | B26B 19/042 |

FOREIGN PATENT DOCUMENTS

| | | | |
|---|---|---|---|
| WO | 2019110335 | A1 | 6/2019 |
| WO | 2019179969 | A1 | 9/2019 |

* cited by examiner

METHODS OF MANUFACTURING A HAIR TRIMMER ATTACHMENT

CROSS-REFERENCE TO PRIOR APPLICATIONS

This application is the U.S. National Phase application under 35 U.S.C. § 371 of International Application No. PCT/EP2021/066769, filed on Jun. 21, 2021, which claims the benefit of European Patent Application No. 20181746.7, filed on Jun. 23, 2020. These applications are hereby incorporated by reference herein.

FIELD OF THE INVENTION

The present disclosure relates to method of manufacturing a hair trimmer attachment and is particularly, although not exclusively, concerned with a method of forming a fixed blade component of a hair trimmer attachment.

BACKGROUND OF THE INVENTION

With reference to FIG. 1, electrically operated hair trimmers often comprise a detachable trimmer attachment 2 comprising a fixed blade 10 and a movable blade (not shown). The fixed blade 10 is often in the form of a guard defining a skin contacting surface 12, which, in use of the hair trimmer, is held against a user's skin. The fixed blade 10 defines a number of guard teeth 14 and hair openings 16 formed between the guard teeth. Hairs can enter the hair openings 16 to be cut between cutting elements of the fixed and movable blades.

With reference to FIGS. 2*a* and 2*b*, in use of the hair trimmer, the trimmer attachment 2 may be moved over the user's skin in a hair cutting direction DH. As depicted, when the trimmer attachment 2 is moved over the user's skin, hairs 4 that are contacted by a distal end surface 14*a* of the guard teeth may be deflected downward towards the skin and may not enter the hair openings 16 or be cut be the hair trimmer.

It is noted that US 2018/257248 A1 discloses a hair trimmer attachment comprising a fixed blade support and a fixed blade.

SUMMARY OF THE INVENTION

According to a first specific aspect, there is provided a method of manufacturing a hair trimmer attachment for a hair trimmer, the hair trimmer attachment comprising a fixed blade comprising:

- a skin contacting part forming a surface of the hair trimmer attachment to be placed against the skin of a user, in use of the hair trimmer, and
- an angled part, the angled part being angled relative to the skin contacting part, e.g. such that the angled part extends away from the users skin when the skin contacting part is placed against the users skin, wherein a plurality of hair openings are spaced apart along a bend between the skin contacting part and the angled part, portions of the fixed blade between the hair openings forming guard teeth of the fixed blade, the method comprising:
- providing a sheet of material for forming the fixed blade, e.g. forming a net for the fixed blade of the hair trimming attachment;
- deforming the sheet of material to conform to a fixed blade support of the hair trimmer attachment to create the bend between the skin contacting part and the angled part of the fixed blade, the bend being curved or angled about an axis extending in a first direction; and
- forming a compound curved and/or angled portion on the fixed blade at the guard teeth. For example, the sheet of material may be deformed over the fixed blade support to create the bend between the skin contacting part and the angled part of the fixed blade. The compound curved and/or angled portion may be formed at the bend.

The attachment may be detachably couplable to a body, e.g. handle, of the hair trimmer. Alternatively, the attachment may be permanently attached to the body of the hair trimmer.

A surface of the component curved and/or angled portion of the fixed blade may be curved and/or angled about the axis extending in the first direction and curved and/or angled about an axis extending in a second direction perpendicular to the first direction.

In a preferred embodiment the second direction is perpendicular to the surface of the hair trimmer attachment to be placed against the skin of a user of the skin contacting part.

The compound curved and/or angled portion of the fixed blade at the guard teeth may act to urge hairs contacting the guard teeth towards the hair openings to be trimmed by the hair trimmer.

The sheet of material may have a thickness of approximately 0.1 mm, such as between 0.08 mm and 0.15 mm. The compound curved and/or angled portion may be formed, e.g. exclusively formed by the sheet of material. The compound curved and/or angled portion may be formed such that a length around the compound curved and/or angled portion, e.g. around an outer surface of the compound curved and/or angled portion, in a plane parallel with a plane of the skin contacting part is equal to or greater than a width of the portions of material between the hair openings prior to the compound curved and/or angled portion being formed. In other words, the compound curved and/or angled portion may be formed without the removal of material from the portion of the sheet of material between the hair openings.

In this way, the compound curved and/or angled portion may be formed without compromising the structural strength of the fixed blade.

A portion of the fixed blade support over which the sheet of material is deformed may have a shape comprising a compound curve and/or that is angled in two or more perpendicular directions. The compound curved and/or angled portion may be formed on the guard teeth by deforming the sheet of material over the fixed blade support at the portion of the fixed blade to bend the sheet of material about an axis extending in a second direction perpendicular to the first direction. Forming the compound curved and/or angled portion of the guard teeth in this way may be quick and cost effective, requiring fewer tools and machine or process changes when manufacturing the hair trimmer attachment.

Forming the compound curved and/or angled portion on the guard teeth may comprise adding material to a surface, e.g. an outer surface of the guard teeth such that the surface of the guard teeth has a compound curved shape. Forming the compound curved and/or angled portion of the guard teeth in this way may be quick and cost effective and may maintain the full width of material of the fixed blade at the guard teeth.

The method may further comprise smoothing, e.g. deburring, edges of the guard teeth edges, e.g. edges of the guide teeth defining the hair openings. The edges may be smoothed such that a length of at least a thickness of the sheet of material is unchanged following the smoothing. Smoothing the edges of the guard teeth may further encourage hairs that contact the guard teeth to be deflected into the hair openings and enhance skin comfort, without compromising the structure of the fixed blade.

According to a second specific aspect, there is provided hair trimmer attachment for a hair trimmer, the hair trimmer attachment comprising:

a fixed blade support; and a fixed blade comprising:

a skin contacting part forming a surface of the hair trimmer attachment to be placed against the skin of a user, in use of the hair trimmer, and an angled part, the angled part being angled relative to the skin contacting part, e.g. such that the angled part extends away from the users skin when the skin contacting part is placed against the users skin, wherein a plurality of hair openings are spaced apart along a bend between the skin contacting part, portions of the fixed blade between the hair openings forming guard teeth of the fixed blade, the bend being formed about an axis extending in a first direction such that the fixed blade conforms to a shape of the fixed blade support, e.g. at the bend, wherein the fixed blade further comprises a compound curved and/or angled portion formed on the guard teeth.

A surface of the component curved and/or angled portion of the fixed blade may be curved and/or angled about the axis extending in the first direction and curved and/or angled about an axis extending in a second direction perpendicular to the first direction. The fixed blade may comprise a sheet of material, such as a metal foil.

In a preferred embodiment the second direction is perpendicular to the surface of the hair trimmer attachment to be placed against the skin of a user of the skin contacting part.

A portion of the fixed blade support a shape of which the guard teeth are made to conform to may have a compound curved and/or angled shape. The guard teeth may be deformed over the portion of the fixed blade support having the compound curved and/or angled shape in order to form the compound curved and/or angled portion formed on the guard teeth. Additionally or alternatively, the hair trimmer attachment may comprise a layer of additional material applied to a surface of the sheet of material at the guard teeth such that the compound curved portion is formed by the layer of additional material. The compound curved and/or angled portion formed on the guard teeth may thereby be formed without the removal of material from the guard teeth.

These and other aspects will be apparent from and elucidated with reference to the embodiment(s) described hereinafter.

BRIEF DESCRIPTION OF THE DRAWINGS

Exemplary embodiments will now be described, by way of example only, with reference to the following drawings, in which.

DETAILED DESCRIPTION OF THE EMBODIMENTS

Figure 1:
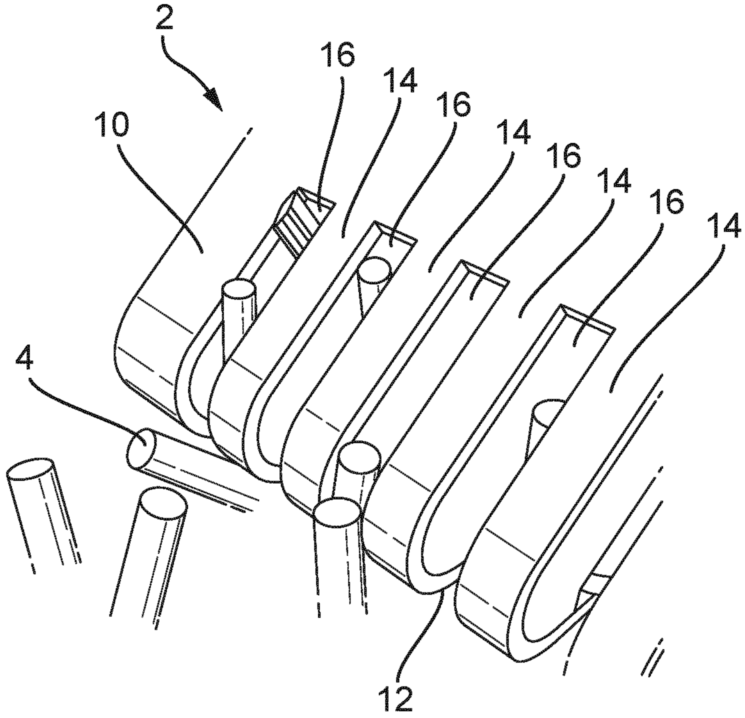
FIG. 1 is a front perspective view of a previously proposed hair trimmer attachment.
Figure 2A:
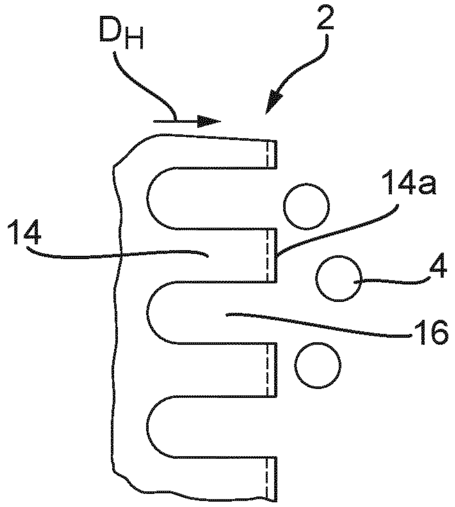
FIGS. 2*a* and 2*b* are partial top views of the previously proposed hair trimmer attachment.
Figure 2B:
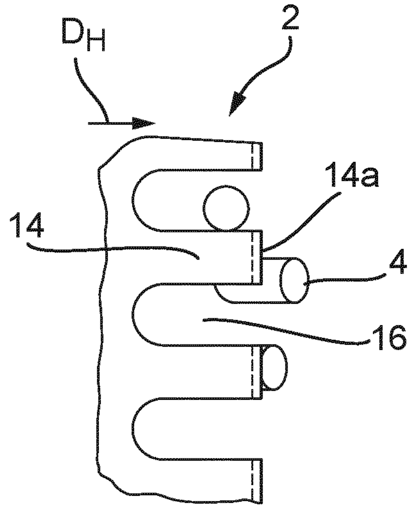
Figure 3:
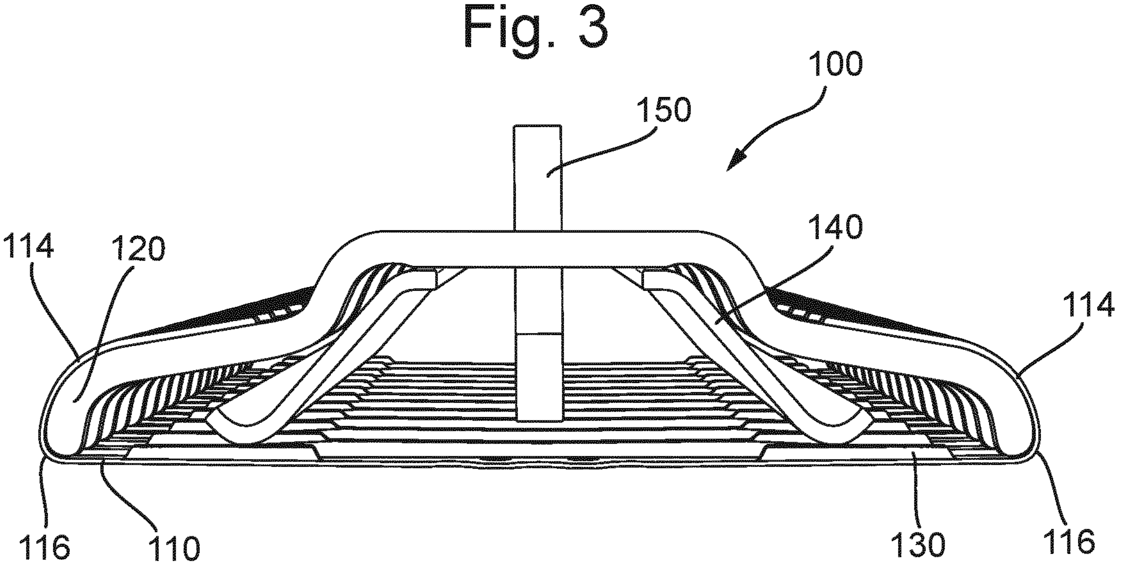
FIG. 3 is a cross-sectional view of a hair trimmer attachment according to arrangements of the present disclosure.
Figure 4:
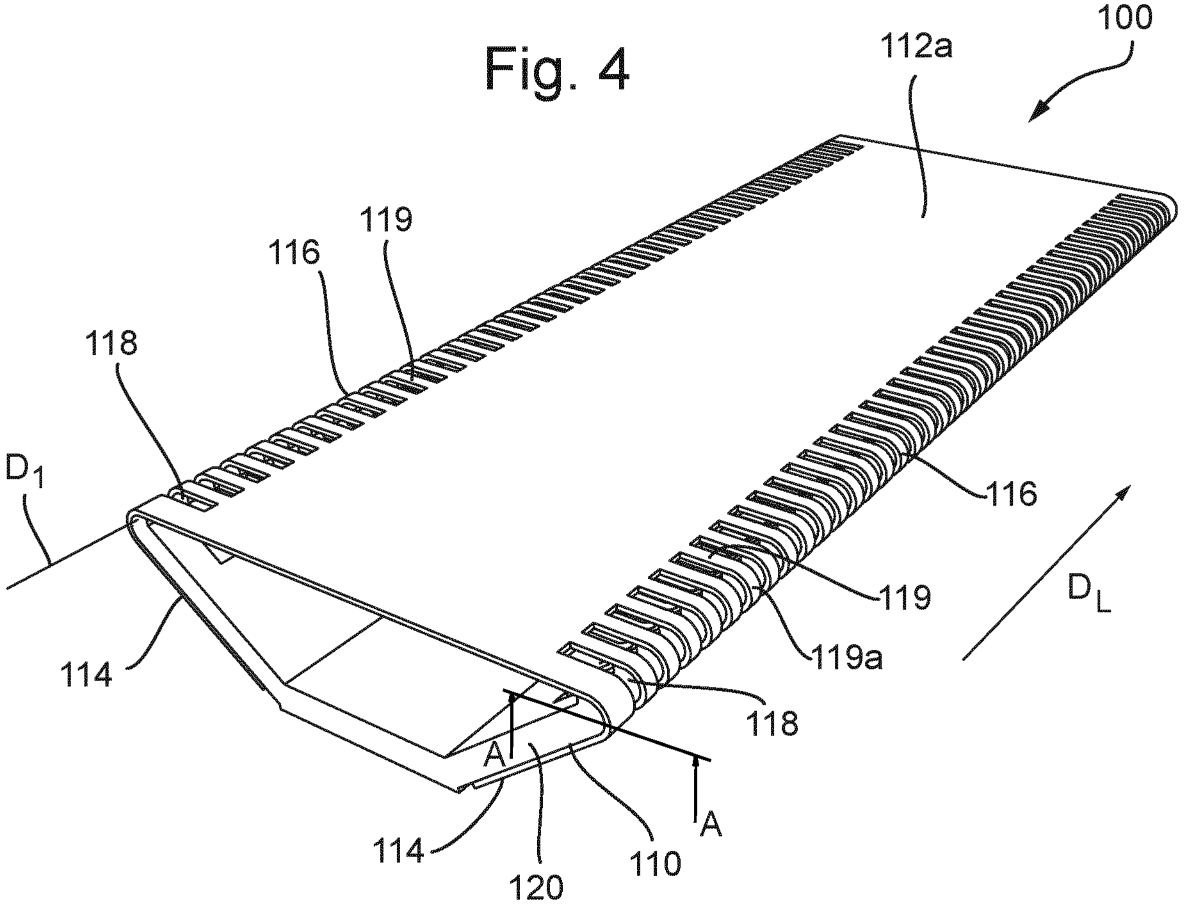
FIG. 4 is a perspective view of a skin contacting surface of the hair trimmer attachment shown in FIG. 3.

With reference to FIGS. 3 and 4, a hair trimmer attachment 100 for a hair trimmer comprises a fixed blade 110, a fixed blade support 120, a movable blade 130, a movable blade support 140, and a transmission member 150.

As shown in FIGS. 3 and 4, the fixed blade 110 may form a guard of the hair trimmer attachment 100, which restricts a user's skin from coming into contact with the movable blade 130 of the hair trimmer attachment 100. The fixed blade 110 may comprise a sheet of material that is formed over and supported by the fixed blade support 120. The fixed blade 110 comprises a skin contacting part 112 defining a skin contacting surface 112*a* to be held against a user's skin in use of the hair trimmer. The skin contacting surface 112*a* may be planar, e.g. defining a flat or curved plane.

The fixed blade 110 further comprises an angled part 114 that is angled relative to the skin contacting part 112. For example, the angled part 114 may be angled relative to the skin contacting part 112 at an angle of between 90 degrees and 180 degrees. The angled part 114 may extend away from the user's skin when the skin contacting surface 112*a* is placed against the users skin. As shown, the angled part 114 extends from a lateral side of the skin contacting part. The fixed blade 110 may be coupled to the fixed blade support 120 at the angled part.

A bend 116 is formed between the skin contacting part 112 and the angled part 114. In the arrangement shown, the bend 116 is a smooth, continuous bend formed about an axis extending in a first direction $D_1$ of the hair trimmer attachment 100. In other arrangements, the bend 116 may comprise one or more discontinuous changes in angle between the skin contacting part 112 and the angled part 114.

A plurality of hair openings 118 are formed in the fixed blade 110. As depicted, the plurality of hair openings 118 may be spaced along the bend 116 in a longitudinal direction DL of the hair trimmer attachment 100. The hair openings 118 may extend from the bend 116 into the skin contacting part 112 and/or the angled part 114 of the fixed blade 110 to form hair openings 118 of desired dimensions for receiving hairs.

Portions of the fixed blade 110, e.g. of the skin contacting part 112, the bend 116 and the angled part 114, between the hair openings 118 may form guard teeth 119 of the fixed blade 110. The bend 116, and optionally portions of the skin contacting part and/or angled part adjacent to the bend 116 may form distal ends 119*a* of the guard teeth 119, which are first to contact hairs when the hair trimmer attachment 100 is moved over the users skin in the hair cutting direction DH. As shown in FIG. 4, the fixed blade 110 may comprise a plurality of guard teeth 119 forming a comb of guard teeth.

As depicted in FIGS. 3 and 4, the hair trimmer attachment 100 may be symmetrical in a lateral direction of the hair trimmer attachment and may comprise an angled part 114, bend 116 and plurality of hair openings 118 at each lateral side of the skin contacting part 112. As shown, the angled parts 114 provided at either lateral side may be arranged at the same angle relative to the skin contacting part or may be at different angles.

The movable blade 130 is held against the fixed blade 110 by the movable blade support 140, and in use of the hair trimmer, the movable blade 130 is caused by transmission member 150 to move, e.g. reciprocate, relative to the fixed blade 110. The movable blade 130 may comprise combs of blade elements at each lateral side of the movable blade 130 that correspond with the comb of hair openings 118 in the fixed blade. The blade elements may be configured to cooperate with edges of the guard teeth 119 to cut hairs that enter the hair openings 118. In some arrangements, a pitch and/or pattern of the comb of blade elements on the movable blade 130 may differ from the pitch and/or pattern of the openings 118 in the fixed blade, e.g. in order to stagger the cutting of hairs between the corresponding guard teeth 119 and blade elements.

A width of the hair openings 118, in the longitudinal direction DL may be selected in order to balance hair cutting performance of the hair trimmer, user comfort and structural strength of the fixed blade 110. Providing hair openings 118 of a greater width separated by guard teeth of a narrower width may enable the hair trimmer attachment 100 to receive more hairs into the hair openings 118 during a movement of the hair trimmer in the hair cutting direction DH. Furthermore, the narrower guard teeth may contact and deflect fewer hairs to cause those hairs to be deflected and not cut. However, increasing the width of the hair openings 118 may reduce user comfort by enabling a user's skin to more easily enter at least partially into the hair openings 118. Reducing the width of the guard teeth 119 may increase pressure on the users skin during use of the hair trimmer and may reduce the structural strength of the fixed blade 110, e.g. at the distal ends 119*a* of the guard teeth, which may reduce the useful life of the hair trimmer attachment 100 before it must be replaced.

In one or more arrangements, widths of the hair openings 118, e.g. in the longitudinal direction DL, may be 0.3 mm, e.g. approximately 0.3 mm. For example, widths of the hair openings 118 may be between 0.25 mm and 0.4 mm. Widths of the guard teeth 119, e.g. in the longitudinal direction DL, may be 0.3 mm, e.g. approximately 0.3 mm. For example, widths of the guard teeth 119 may be 0.3 mm or greater.

Figure 5:
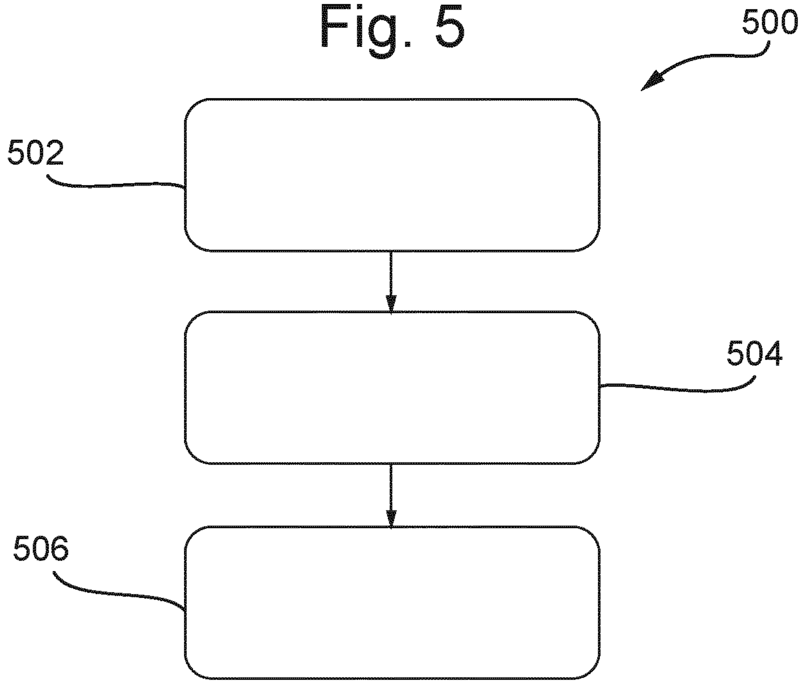
FIG. 5 is a flow chart depicting a method of manufacturing a hair trimmer attachment according to arrangements of the present disclosure.

With reference to FIG. 5, a hair trimmer attachment, such as the hair trimmer attachment 100, may be manufactured according to a method 500. The method 500 comprises a first block 502, at which material for forming the fixed blade 110 is provided. The material may be a sheet of material, e.g. a foil, such as a metal foil. Alternatively, the material may be a polymer material or a composite material, such as metal with a polymer coating. The material may have a thickness of 0.1 mm, e.g. approximately 0.1 mm, such as between 0.08 mm and 0.15 mm.

The material provided at the first block 502 may comprise a net shape of the fixed blade 110 for the hair trimmer attachment 100. The material may comprise openings configured to form the hair openings 118 in the fixed blade 110, e.g. once the material has been formed into shape. The sheet of material may be manufactured, and the openings for forming the hair openings 118 may be formed in the sheet of material, using any desired process or processes. For example, the material may be manufactured using a stamping or etching process. Alternatively, the material may be grown in the desired shape using an electro-forming process, such as a nickel electro-forming process.

The method 500 further comprises a second block 504, at which the sheet of material is deformed over the fixed blade support 120 of the hair trimmer attachment to create the bend 116 between the skin contacting part 112 and the angled part 114 of the fixed blade. As described above, the bend 116 may be curved and/or angled about the axis extending in the first direction and, at the second block, the fixed blade 110 may by deformed, e.g. bent, curved or angled about the axis extending in the first direction $D_1$.

As described above with reference to FIGS. 3 and 4, the hair trimmer attachment 100 may be symmetrical and may comprise an angled part 114 on either lateral side of the fixed blade 110. The second block 504 of the method 500 may be repeated in order to create the bend 116 between the skin contacting part 112 and the angled part 114 on the other lateral side of the fixed blade 110.

The method 500 further comprises a third block 506 at which a compound curved and/or angled portion is formed on the guard teeth 119, e.g. at the distal ends 119*a* of the guard teeth. In other words, at the third block 506, surfaces of fixed blade 110 forming the distal ends 119*a* of the guard teeth 119, e.g. the parts of the guard teeth 119 that may be first to contact hairs when the hair trimmer is moved in the hair trimming direction, may be formed or shaped to be curved and/or angled about the axis extending in the first direction $D_1$ and an axis extending in a second direction (depicted in FIGS. 6*a* and 7*a*) perpendicular to the first direction $D_1$. In some arrangements, the surfaces of fixed blade 110 forming the distal ends 119*a* of the guard teeth may be formed or shaped such that the surfaces are spherical, e.g. form portions of a surface of a sphere.

The compound curved and/or angled portion may be formed on the guard teeth without the removal of material from the fixed blade. More particularly, the compound curved and/or angled portion may be formed on the guard teeth without the removal of material from the fixed blade which results in a width of the material of the guard teeth being reduced over at least a thickness of the sheet of material forming the guard teeth. Accordingly, a length across one of the guard teeth 119 around the compound curved and/or angled portion in a plane parallel with the skin contacting part and/or the first direction may be substantially equal to or greater than a width of the one of the guard teeth prior to the compound curve portion being formed, e.g. prior to the third block 506 of the method 500 being performed. For example, the length around the compound curved and/or angled part may be 0.3 mm or greater, or 0.25 mm or greater.

Forming the compound curved and/or angled portion at the guard teeth in this way may improve the structural strength of the fixed blade 110 at the distal end 119*a* of the guard teeth, e.g. compared to hair trimmer attachments on which material is removed from the fixed blade in order to shape the guard teeth.

In some arrangements, the compound curved and/or angled portion of the fixed blade may be formed, e.g. exclusively formed, by the material of the sheet of material, e.g. provided at the first block 502.

Figure 6A:
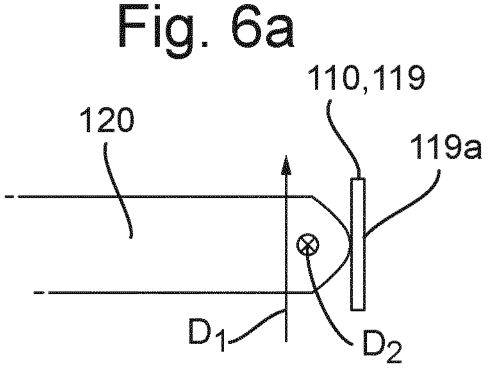
FIGS. 6*a* and 6*b* are cross-sectional views of a guard tooth and portion of a fixed blade, along line A-A shown in FIG. 4, at different stages during a method of manufacturing a hair trimmer attachment according to arrangements of the present disclosure.

FIG. 6*a* depicts a partial cross-section though a guard tooth 119 of a fixed blade 110 and the fixed blade support 120 in a plane parallel with the skin contacting part 112 and the first direction $D_1$ after the completion of the second block 504 of the method 500 and prior to the completion of the third block 506. As depicted, at this stage during the method 500, the cross-section of the distal end 119*a* of the guard tooth 119 is substantially flat and planar.

Figure 6B:
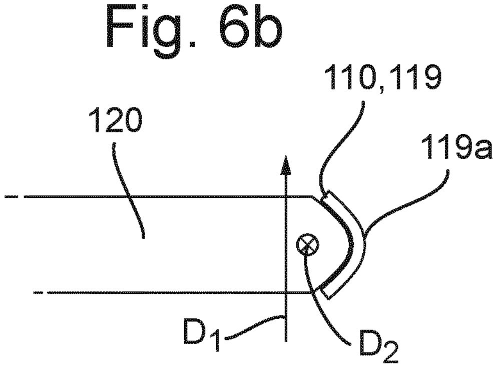

As shown in FIGS. 6*a* and 6*b*, portions of the fixed blade support 120, over which each of the guard teeth of the fixed blade 110 is deformed, may have shapes which are curved and/or angled about an axis extending in a second direction $D_2$ that is perpendicular to the first direction $D_1$. At the third block 506 of the method, the compound curved and/or angled portion may be formed on the distal ends 119*a* of the guard teeth by deforming each of the portions of the fixed blade 110 forming the distal ends 119*a* of the guard teeth over the compound curved and/or angled shapes of the fixed blade support 120 about respective axes extending in the second direction $D_2$. In particular, the curved and/or angled portions may be formed by bending and/or angling the fixed blade 110, e.g. the distal ends 119*a* of the guard teeth, about axes extending in the second direction $D_2$. As depicted in FIG. 6*b*, the guard teeth may be deformed to conform to the compound curved and/or angled shapes of the fixed blade support 120.

Figure 7A:
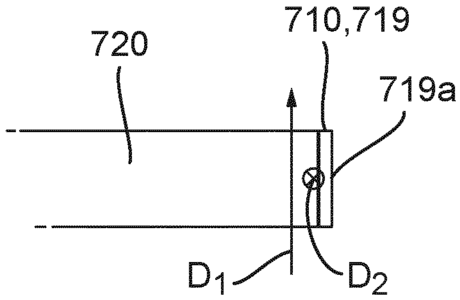
FIGS. 7*a* and 7*b* are cross-sectional views of a guard tooth and portion of a fixed blade, along line A-A shown in FIG. 4, at different stages during another method of manufacturing a hair trimmer attachment according to arrangements of the present disclosure.

FIG. 7*a* depicts a partial cross-section though guard tooth 719 of a fixed blade 710 and a fixed blade support 720 of a hair trimmer attachment 700 according to another arrangement of the present disclosure. The hair trimmer attachment 700 is similar to the hair trimmer attachment 100 and the features described above in relation to the hair trimmer attachment 100 may apply equally to the hair trimmer attachment 700.

The partial cross-section shown in FIG. 7*a* is in a plane parallel with a skin contacting part 712 of the fixed blade 710 and the first direction $D_1$. FIG. 7*a* shows the fixed blade 710 and fixed blade support 720 after the completion of the second block 504 and prior to the completion of the third block 506. As depicted, at this stage during the method 500, the cross-section of a distal end 719*a* of the guard tooth is substantially flat and planar.

Figure 7B:
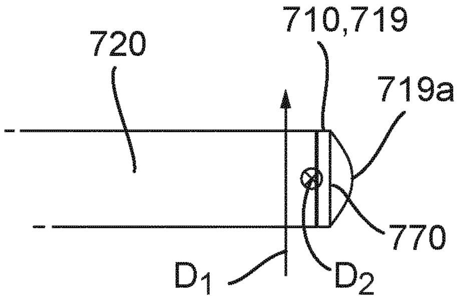

As depicted in FIG. 7*b*, the curved and/or angled portion may be formed on the guard teeth 719, at the third block 506, by applying a layer of material 770 to the guard teeth. The layer may comprise a polymer material, which may be applied to the guard teeth and cured to form the layer of material 770.

In the arrangement shown in FIGS. 7*a* and 7*b*, the portion of the fixed blade support 720 that supports the one of the guard teeth 119 does not comprise a compound curved or angled shape. However, in other arrangements, the shape of the fixed blade support 720 may be the same as the shape of the fixed blade support 120 depicted in FIGS. 6*a* and 6*b*.

Figure 8:
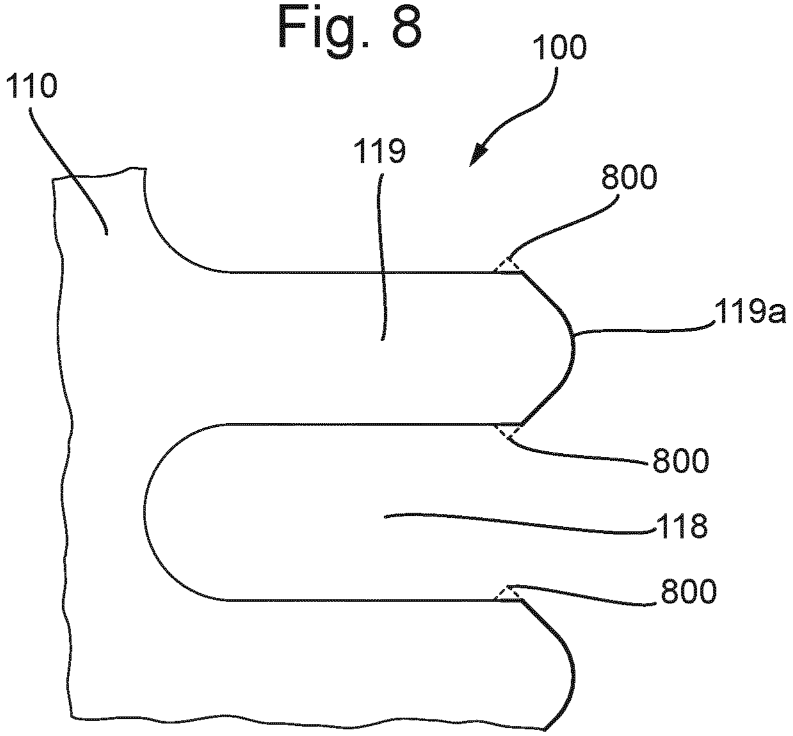
FIG. 8 is a partial top view of the hair trimmer attachment according to arrangements of the present disclosure.

With reference to FIG. 8, in some arrangements, edges of the guard teeth 119 are smoothed, e.g. to remove burrs 800 present on the guard teeth, for example, on edges of the guard teeth defining the hair openings 118, following the forming of the compound curved and/or angled portion on the guard teeth. A thickness of material removed from the fixed blade 110, e.g. a depth of a chamber or radius applied to edges of the fixed blade, in order to smooth the edges of the guard teeth may be less than the thickness of the sheet of material from which the fixed blade is formed. Accordingly, a length around the compound curved and/or angled portion in a plane parallel with the skin contacting part and/or the first direction of at least a thickness of the sheet of material may be unchanged following the smoothing.

Figure 9A:
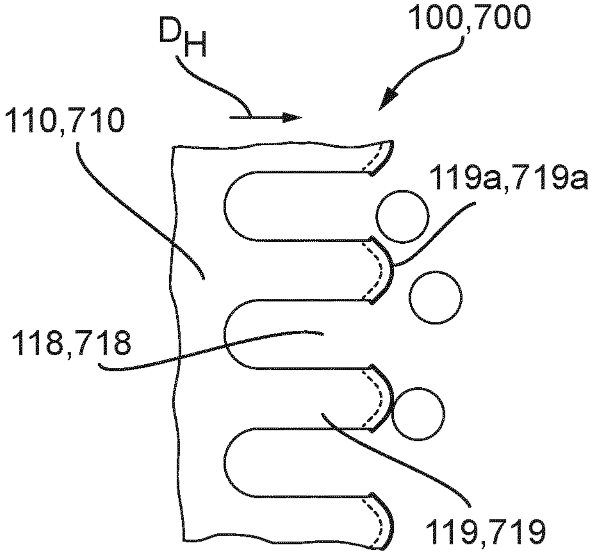
FIGS. 9*a* and 9*b* are partial top views of the hair trimmer attachment according to arrangements of the present disclosure.
Figure 9B:
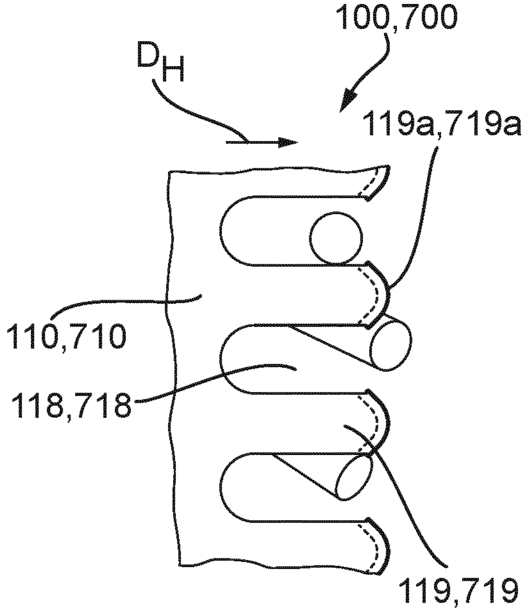

With reference to FIGS. 9*a* and 9*b*, by forming the compound curved and/or angled portions on the guard teeth 119, 719, the guard teeth may be shaped such that when the fixed blade 110, 710 is moved in the hair trimming direction DH during use of the hair trimmer, hairs that are not aligned with the hair openings 118 and contact the guard teeth are urged sideways towards the hair openings 118, due to the curved and/or angles shape of the distal ends 119*a*, 719*a* guard teeth. The hairs that are urged towards the hair openings 118, 718 may enter the hair openings to reach the movable blade and thereby be trimmed by the hair trimmer together with the hairs that were already aligned with the hair openings. Forming the curved and/or angled portion on the guard teeth may therefore increase the number of hair being trimmer by the hair trimmer during a single movement of the hair trimmer in the hair trimming direction DH. As described above, the width of the guard teeth and the openings may be selected in order to balance hair cutting performance with skin comfort and structural strength of the fixed blade. However, by forming the curved and/or angled portion on the guard teeth as herein described, hair cutting performance of the hair trimmer may be improved without affecting skin comfort or structural strength of the fixed blade.

Variations to the disclosed embodiments can be understood and effected by those skilled in the art in practicing the principles and techniques described herein, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of manufacturing a hair trimmer attachment for a hair trimmer, the hair trimmer attachment comprising a fixed blade comprising:

a skin contacting part forming a surface of the hair trimmer attachment to be placed against the skin of a user, in use of the hair trimmer, and an angled part, the angled part being angled relative to the skin contacting part, wherein a plurality of hair openings are spaced apart along a bend between the skin contacting part and the angled part, portions of the fixed blade between the hair openings forming guard teeth of the fixed blade, the method comprising:

providing a sheet of material for forming the fixed blade;

deforming the sheet of material to conform to a fixed blade support of the hair trimmer attachment to create the bend between the skin contacting part and the angled part of the fixed blade, the bend being curved and/or angled about an axis extending in a first direction; and forming a compound curved and/or angled portion on the fixed blade at the guard teeth, such that a surface of the guard teeth is curved and/or angled about the axis in the first direction and is curved and/or angled about an axis in a second direction perpendicular to the first direction, wherein a portion of the fixed blade support over which the sheet of material is deformed has a shape comprising a compound curve, wherein the compound curved and/or angled portion is formed on the guard teeth by deforming the sheet of material over the fixed blade support at the portion of the fixed blade to bend the sheet of material about an axis extending in a second direction perpendicular to the first direction.

2. The method of claim 1, wherein the second direction is perpendicular to the surface of the hair trimmer attachment to be placed against the skin of a user of the skin contacting part.

3. The method of claim 1, wherein the compound curved and/or angled portion is formed such that a length around the compound curved and/or angled portion in a plane parallel with a plane of the skin contacting part and/or the first direction is substantially equal to or greater than a width of the portions of material between the hair openings prior to the compound curved and/or angled portion being formed.

4. The method of claim 1, wherein forming the compound curved and/or angled portion on the guard teeth comprises adding material to a surface of the guard teeth such that the surface of the guard teeth has a compound curved and/or angled shape.

5. The method of claim 1, wherein the sheet of material has a thickness of approximately 0.1 mm.

6. The method of claim 1, wherein the method further comprises:

smoothing edges of the guard teeth.

7. A hair trimmer attachment for a hair trimmer, the hair trimmer attachment comprising:

a fixed blade support; and a fixed blade comprising:

a skin contacting part forming a surface of the hair trimmer attachment to be placed against the skin of a user, in use of the hair trimmer, and an angled part, the angled part being angled relative to the skin contacting part, wherein a plurality of hair openings are spaced apart along a bend between the skin contacting part, portions of the fixed blade between the hair openings forming guard teeth of the fixed blade, the bend being formed about an axis extending in a first direction such that the fixed blade conforms to a shape of the fixed blade support, wherein the fixed blade further comprises a compound curved and/or angled portion formed on the guard teeth, such that a surface of the guard teeth is curved and/or angled about the axis in the first direction and is curved and/or angled about an axis in a second direction perpendicular to the first direction, wherein the fixed blade comprises a sheet of material, and wherein a portion of the fixed blade support over which the sheet of material is deformed has a shape comprising a compound curve, wherein the compound curved and/or angled portion is formed on the guard teeth by deforming the sheet of material over the fixed blade support at the portion of the fixed blade to bend the sheet of material about an axis extending in a second direction perpendicular to the first direction.

8. The hair trimmer attachment of claim 7, wherein the second direction is perpendicular to the surface of the hair trimmer attachment to be placed against the skin of a user of the skin contacting part.

9. The hair trimmer attachment of claim 7, wherein the fixed blade further comprises a layer of additional material applied to a surface of the sheet of material at the guard teeth such that the compound curved portion is formed by the layer of additional material.

10. The hair trimmer attachment of claim 7, wherein the compound curved and/or angled portion on the guard teeth comprises material added to a surface of the guard teeth such that the surface of the guard teeth has a compound curved and/or angled shape.

11. The hair trimmer attachment of claim 7, wherein the sheet of material has a thickness of approximately 0.1 mm.

12. The hair trimmer attachment of claim 7, wherein the edges of the guard teeth are smoothed.

* * * * *